United States Patent
Bhuruth

(10) Patent No.: US 9,767,612 B2
(45) Date of Patent: Sep. 19, 2017

(54) METHOD, SYSTEM AND APPARATUS FOR REMOVING A MARKER PROJECTED IN A SCENE

(71) Applicant: CANON KABUSHIKI KAISHA, Tokyo (JP)

(72) Inventor: Berty Jacques Alain Bhuruth, Clemton Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/571,163

(22) Filed: Dec. 15, 2014

(65) Prior Publication Data

US 2015/0178992 A1    Jun. 25, 2015

(30) Foreign Application Priority Data

Dec. 19, 2013  (AU) ................................ 2013273722

(51) Int. Cl.
G06T 19/00  (2011.01)
G06T 19/20  (2011.01)
G06T 5/50  (2006.01)

(52) U.S. Cl.
CPC .............. *G06T 19/006* (2013.01); *G06T 5/50* (2013.01); *G06T 19/20* (2013.01); *G06T 2207/20221* (2013.01); *G06T 2207/30204* (2013.01); *G06T 2219/2024* (2013.01)

(58) Field of Classification Search
CPC .................................................. G06T 19/006
See application file for complete search history.

(56) References Cited

U.S. PATENT DOCUMENTS 5,870,136 A    2/1999    Fuchs et al.
7,182,465 B2   2/2007    Fuchs et al.
(Continued)

OTHER PUBLICATIONS

Grundhofer et al. "Dynamic Adaptation of Projected Imperceptible Codes", Mixed and Augmented Reality, 2007, ISMAR 2007. 6th IEEE and ACM International Symposium on. IEEE, 2007, pp. 1-10.
(Continued)

*Primary Examiner* — Kee M Tung
*Assistant Examiner* — Yanna Wu
(74) *Attorney, Agent, or Firm* — Canon USA, Inc. I.P. Division

(57) ABSTRACT

A method of removing a marker projected in a scene from a view of the scene. A first image of the scene is captured using a camera (e.g., 127A). A second image of the scene is captured, using the camera (127A), following a marker (310) being projected onto an object in the scene to indicate a reference location in the scene for positioning a virtual object, the second image containing a representation of the projected marker. The second image is interleaved with the first image. A data stream is formed using at least the first and second image to generate a view of the scene, the data stream containing data representing the virtual object as part of the captured images of the scene. The virtual object is positioned relative to the projected marker captured in the second image. Pixels from the first image are used as pixel values at pixel locations where the projected marker was located in the second image to remove the projected marker from the generated view of the scene.

15 Claims, 14 Drawing Sheets

(56) References Cited

U.S. PATENT DOCUMENTS

| | | | |
|---|---|---|---|
| 8,825,187 B1* | 9/2014 | Hamrick | H04S 7/304 700/94 |
| 2008/0317332 A1 | 12/2008 | Ivanov et al. | |
| 2013/0093788 A1* | 4/2013 | Liu | G06F 3/011 345/633 |
| 2013/0162674 A1* | 6/2013 | Nakamura | G06K 9/228 345/633 |
| 2015/0294478 A1* | 10/2015 | Lee | G06K 9/00 382/103 |

OTHER PUBLICATIONS

Park et al., "Invisible Marker Based Augmented Reality System", Visual Communications and Image Processing 2005, Proceedings of SPIE, vol. 5960, pp. 596011-1-596011-1-596011-8.

Nakazato et al., "Localization of Wearable Users Using Invisible Retro-reflective Markers and an IR Camera", Electronic Imaging 2005, International Society for Optics and Photonics, 2005, pp. 1-8.

Rusu et al., "Fast 3D Recognition and Pose Using the Viewpoint Feature Histogram", Intelligent Robots and Systems (IROS), 2010 IEEE/RSJ International Conference on. IEEE, 2010, pp. 1-8.

Kato et al., "Marker Tracking and HMD Calibration for a Video-based Augmented Reality Conferencing System", Augmented Reality, 1999.(IWAR'99) Proceedings. 2nd IEEE and ACM International Workshop on. IEEE, 1999, pp. 1-10.

Zhang et al., "Visual Marker Detection and Decoding in AR Systems: A Comparative Study", Proceedings of the 1st International Symposium on Mixed and Augmented Reality. IEEE Computer Society, 2002, pp. 1-10.

Hirzer, Martin, "Marker Detection for Augmented Reality Applications", Inst. for Computer Graphics and Vision, Graz University of Technology, Austria, Oct. 27, 2008, pp. 1-27.

* cited by examiner

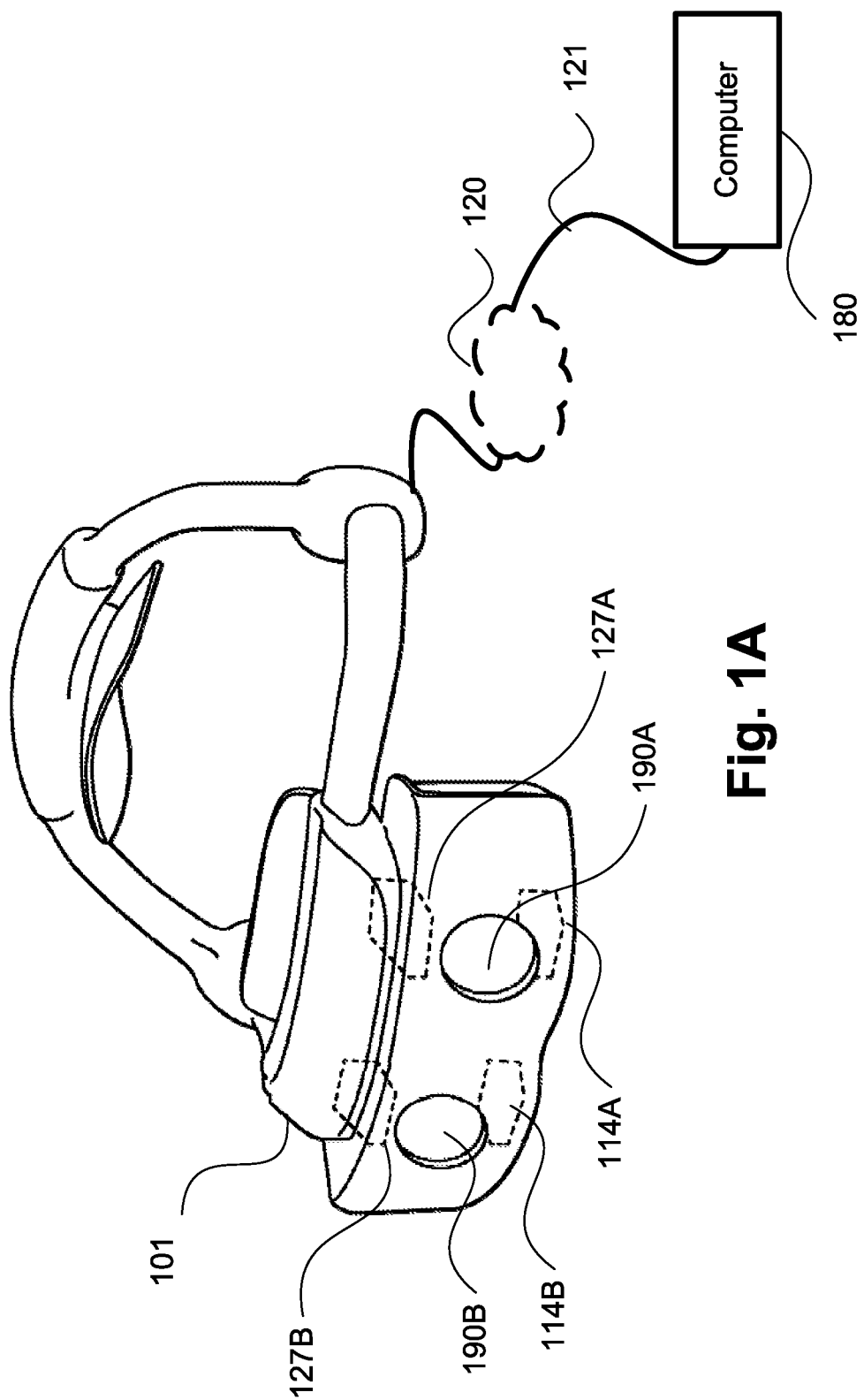

310

METHOD, SYSTEM AND APPARATUS FOR REMOVING A MARKER PROJECTED IN A SCENE

REFERENCE TO RELATED PATENT APPLICATION(S)

This application claims the benefit under 35 U.S.C. §119 of the filing date of Australian Patent Application No. 2013273722, filed 19 Dec. 2013, hereby incorporated by reference in its entirety as if fully set forth herein.

TECHNICAL FIELD

The current invention relates to augmented reality systems and, in particular, to hiding projected markers from an augmented view. The present invention also relates to a method and apparatus for removing a marker projected in a scene, and to a computer program product including a computer readable medium having recorded thereon a computer program for removing a marker projected in a scene.

BACKGROUND

Augmented reality is becoming increasingly common in many applications. Augmented reality refers to presentation of a live view of a physical real-world scene along with additional computer-generated images. The computer-generated images are superimposed on a user's view of the real world scene, thus providing a composite view. The computer-generated images commonly represent one or more virtual objects. The virtual objects are not tangible, and are only visible through the view of the augmented reality.

Commonly a marker is placed in the real-world scene to inform an augmented reality system of the location of a virtual object. The marker may be a two-dimensional binary pattern distinguishable from other objects in the scene. A marker can be printed on paper and attached to a physical surface. Alternatively, a marker can be projected onto a scene using an image projector. In either case, the marker becomes part of the real-world scene. As a consequence, both the virtual object and also the marker become visible in the augmented view of the scene.

One method of addressing the above is by printing the marker with infra-red ink. The marker is then captured by an augmented reality system using an additional infra-red camera. Another method prints the marker with translucent retro-reflective ink. The marker is not visible in general, and is only detectable when illuminated using an IR-LED.

Another method projects a visible marker at a high frame rate (e.g., 120 Hz) and captures the marker with a high speed camera. For every alternate frame, the method also projects a complement image of the marker. Because the human eye is not capable of seeing at very high frame rates, the marker and the complement of the marker merge into a region of flat light (i.e. a region of uniform illumination) making the marker imperceptible to an observer. The method hides the marker, but also creates an unwanted flat light region.

Another method projects a marker and the complement of the marker alternately at a high frame rate. The method constructs the marker and the complement in such a way that the two merge into a photographic image, instead of a flat light region.

Thus, a need exists for an improved method of removing a marker from a projected marker.

SUMMARY

It is an object of the present invention to substantially overcome, or at least ameliorate, one or more disadvantages of existing arrangements.

Disclosed are arrangements which can hide a projected marker in an augmented view of a scene with no unwanted additional light.

According to one aspect of the present disclosure, there is provided a method of removing a marker projected in a scene from a view of the scene, the method comprising:

capturing a first image of the scene using a camera;

capturing a second image of the scene, using the camera, following a marker being projected onto an object in the scene to indicate a reference location in the scene for positioning a virtual object, the second image containing a representation of the projected marker, wherein the second image is interleaved with the first image; and forming a data stream using at least the first and second image to generate a view of the scene, the data stream containing data representing the virtual object as part of the captured images of the scene, the virtual object being positioned relative to the projected marker captured in the second image and using pixels from the first image as pixel values at pixel locations where the projected marker was located in the second image to remove the projected marker from the generated view of the scene.

According to another aspect of the present disclosure, there is provided an apparatus for removing a marker projected in a scene from a view of the scene, the apparatus comprising:

means for capturing a first image of the scene using a camera;

means for capturing a second image of the scene, using the camera, following a marker being projected onto an object in the scene to indicate a reference location in the scene for positioning a virtual object, the second image containing a representation of the projected marker, wherein the second image is interleaved with the first image; and means for forming a data stream using at least the first and second image to generate a view of the scene, the data stream containing data representing the virtual object as part of the captured images of the scene, the virtual object being positioned relative to the projected marker captured in the second image and using pixels from the first image as pixel values at pixel locations where the projected marker was located in the second image to remove the projected marker from the generated view of the scene.

According to still another aspect of the present disclosure, there is provided a system for removing a marker projected in a scene from a view of the scene, the system comprising:

a memory for storing data and a computer program;

a processor coupled to the memory for executing the computer program, said computer program comprising instructions for:

capturing a first image of the scene using a camera;

capturing a second image of the scene, using the camera, following a marker being projected onto an object in the scene to indicate a reference location in the scene for positioning a virtual object, the second image containing a representation of the projected marker, wherein the second image is interleaved with the first image; and forming a data stream using at least the first and second image to generate a view of the scene, the data stream containing data representing the virtual object as part of the captured images of the scene, the virtual object being positioned relative to the projected marker captured in the second image and using pixels from the first image as pixel values at pixel locations where the projected marker was located in the second image to remove the projected marker from the generated view of the scene.

According to still another aspect of the present disclosure, there is provided a computer readable medium having a computer program stored thereon for removing a marker projected in a scene from a view of the scene, the program comprising:

code for capturing a first image of the scene using a camera;

code for capturing a second image of the scene, using the camera, following a marker being projected onto an object in the scene to indicate a reference location in the scene for positioning a virtual object, the second image containing a representation of the projected marker, wherein the second image is interleaved with the first image; and code for forming a data stream using at least the first and second image to generate a view of the scene, the data stream containing data representing the virtual object as part of the captured images of the scene, the virtual object being positioned relative to the projected marker captured in the second image and using pixels from the first image as pixel values at pixel locations where the projected marker was located in the second image to remove the projected marker from the generated view of the scene.

Other aspects of the invention are also disclosed.

BRIEF DESCRIPTION OF THE DRAWINGS

One or more embodiments of the invention will now be described with reference to the following drawings, in which:

FIGS. 1A, 1B and 1C collectively show an augmented reality system upon which described arrangements can be practiced;

DETAILED DESCRIPTION INCLUDING BEST MODE

Figure 1B:
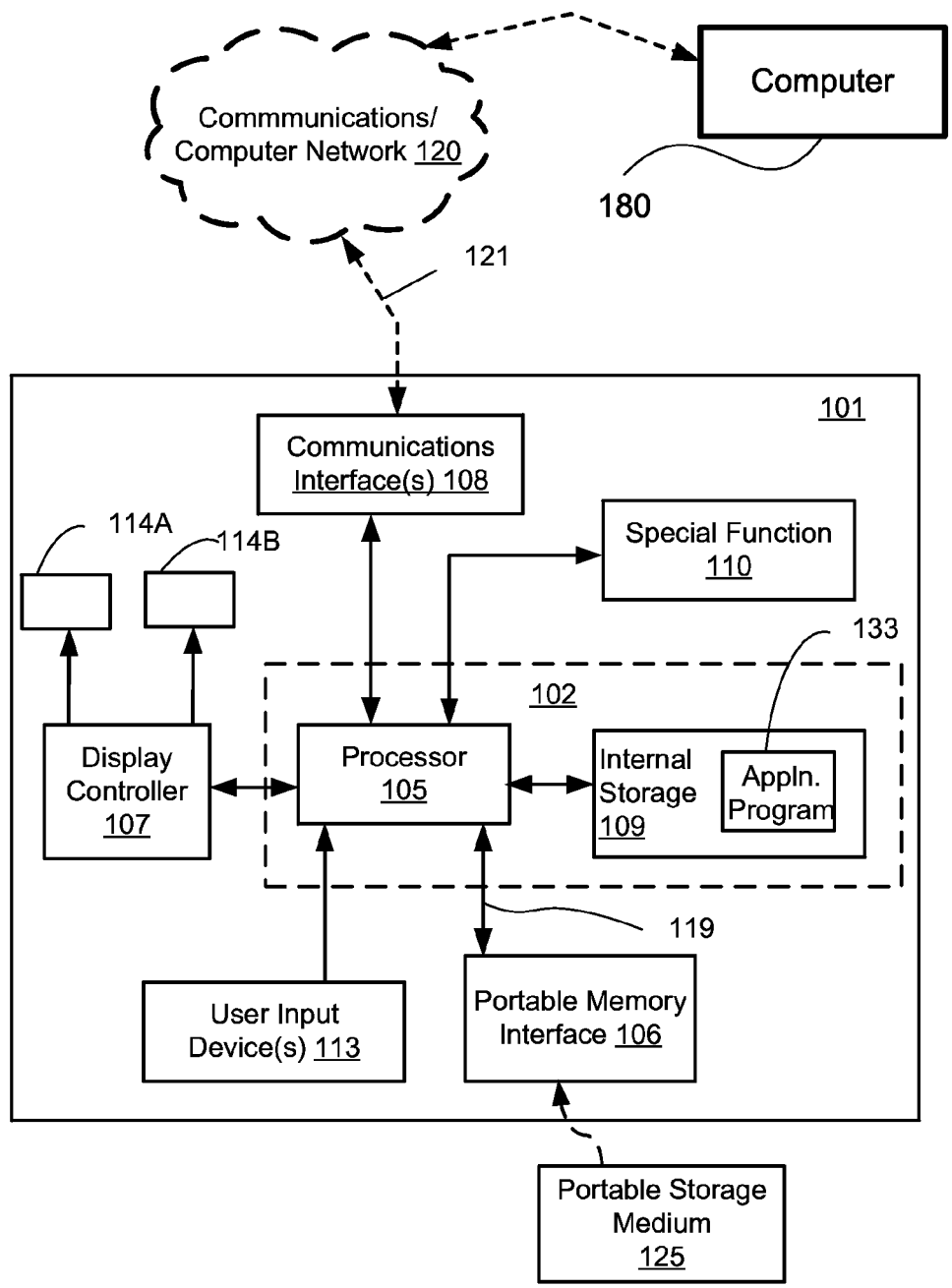

Where reference is made in any one or more of the accompanying drawings to steps and/or features, which have the same reference numerals, those steps and/or features have for the purposes of this description the same function(s) or operation(s), unless the contrary intention appears.

An augmented reality system that hides projected markers from an augmented view of a scene is described below. Augmented reality refers to the presentation of a live view of a physical real-world scene along with additional computer-generated images superimposed on the live view. The computer-generated images commonly represent one or more virtual objects. The virtual objects are not tangible, and are only visible through the view of the augmented reality.

FIG. 1A shows an augmented reality system 100 according to one arrangement. The augmented reality system 100 comprises two cameras 127A and 127B and two video displays 114A and 114B. In the arrangement of FIG. 1A, the cameras 127A and 127B and the displays 114A and 114B are mounted onto a wearable goggle 101. The goggle 101 has openings 190A and 190B allowing light from outside the goggle 101 to reach the cameras 127A and 127B. The goggle 101 is an electronic device including embedded components, upon which methods to be described are desirably practiced. Although, the cameras 127A, 127B and the displays 114A and 114B are shown mounted on the wearable goggle 101, the cameras 127A, 127B, and displays 114A, 114B may be mounted in any other configuration suitable for performing the described methods. Further, one or more steps of the methods to be described may also be performed on higher-level devices such as desktop computers, server computers, and other such devices with significantly larger processing resources than the goggle 101 which may have relatively limited processing resources.

Figure 1C:
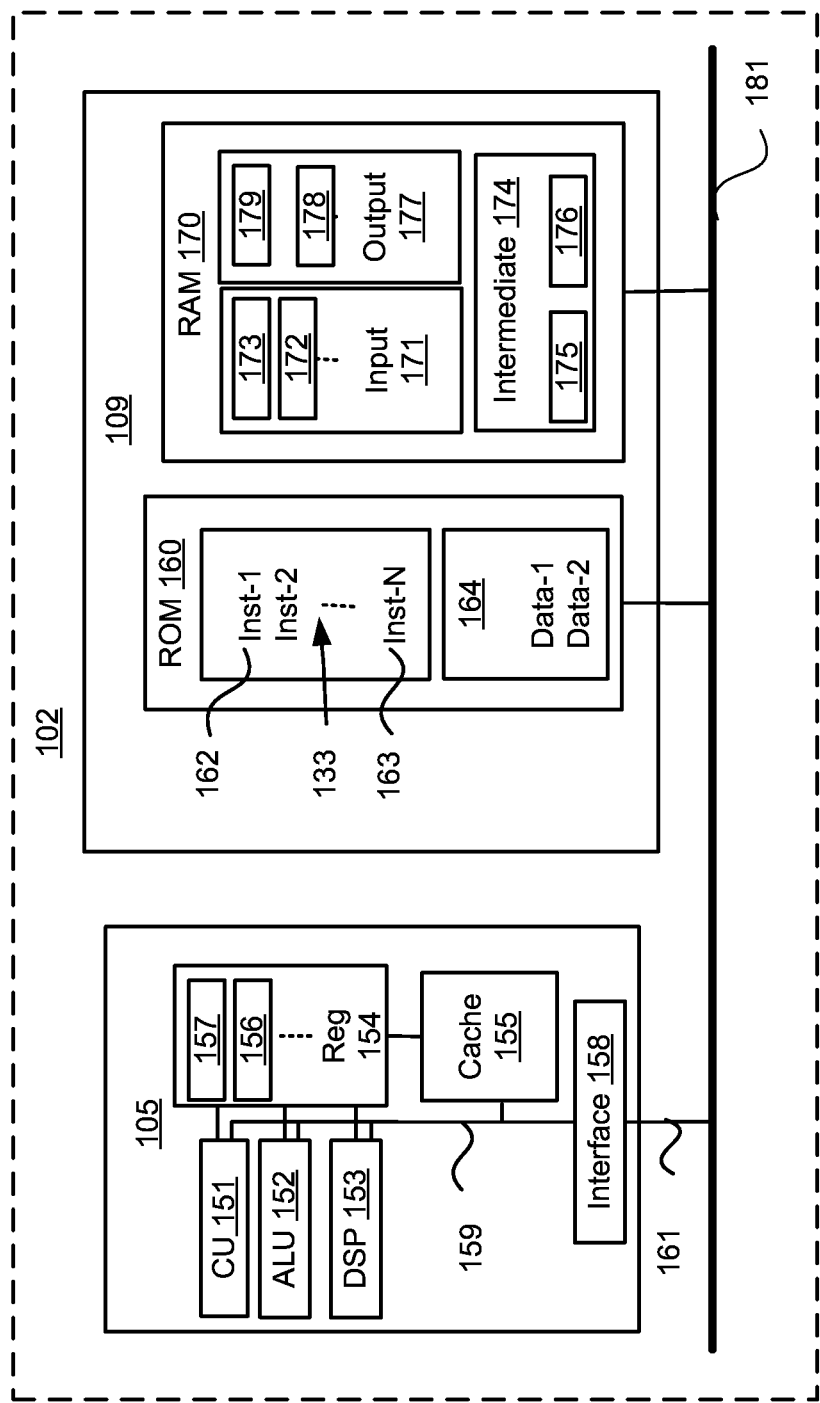

FIGS. 1B and 1C collectively form a schematic block diagram of the goggle 101. As seen in FIG. 1B, the goggle 101 comprises an embedded controller 102. Accordingly, the goggle 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1C. The RAM 170 may be volatile, non-volatile or a combination of volatile and non-volatile memory.

The goggle 101 includes a display controller 107, which is connected to the two video displays 114A and 114B. The display controller 107 is configured for displaying graphical images on the video displays 114A and 114B in accordance with instructions received from the embedded controller 102, to which the display controller 107 is connected.

The goggle 101 also includes user input devices 113 which are typically formed by keys, a keypad or like controls. In some implementations, the user input devices 113 may include a touch sensitive pad. Such a touch sensitive pad may thus operate as one form of graphical user interface (GUI) as opposed to a prompt or menu driven GUI typically used with keypad-display combinations. Other forms of user input devices may also be used, such as a microphone (not illustrated) for voice commands, gesture control where motions of a user are decoded to determine commands or a thumb wheel (not illustrated) located on the goggle 101 for ease of navigation about menus. In one arrangement, the goggle 101 may be controlled using the "voice commands" possibly in conjunction with actions performed using the touch sensitive pad.

The goggle 101 also includes an input/output (I/O) interface 115 that couples to the cameras 127A and 127B.

As seen in FIG. 1B, the goggle 101 comprises a portable memory interface 106, which is coupled to the processor 105 via a connection 119. The portable memory interface 106 allows a complementary portable memory device 125 to be coupled to the goggle 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The goggle 101 also has a communications interface 108 to permit coupling of the goggle 101 to a computer 180 or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The goggle 101 comprises components 110. In one arrangement, the components 110 may represent a lens, focus control and image sensor for each of the cameras 127A and 127B. The special function components 110 are connected to the embedded controller 102. As another example, the device 101 may represent those components required for communications in a cellular telephone environment. In one arrangement, the special function components 110 may also represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 102, where the processes of FIGS. 5, 7 and 9 may be implemented as one or more software application programs 133 executable within the embedded controller 102. The goggle 101 of FIGS. 1A and 1B implements the described methods. In particular, with reference to FIG. 1C, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the goggle 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the goggle 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the displays 114A and 114B. Through manipulation of the user input device 113 (e.g., the touchscreen), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1C illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the goggle 101 is initially powered up, a system program resident in the ROM 160 is executed. The application program 133 permanently stored in the ROM 160 is sometimes referred to as "firmware". Execution of the firmware by the processor 105 may fulfill various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organized into blocks, which perform specific tasks or handle specific events that occur in the goggle 101. Typically, the application program 133 waits for events and subsequently executes the block of code associated with that event. Events may be triggered in response to input from a user, via the user input devices 113 of FIG. 1B, as detected by the processor 105. Events may also be triggered in response to other sensors and interfaces in the goggle 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Figure 2:
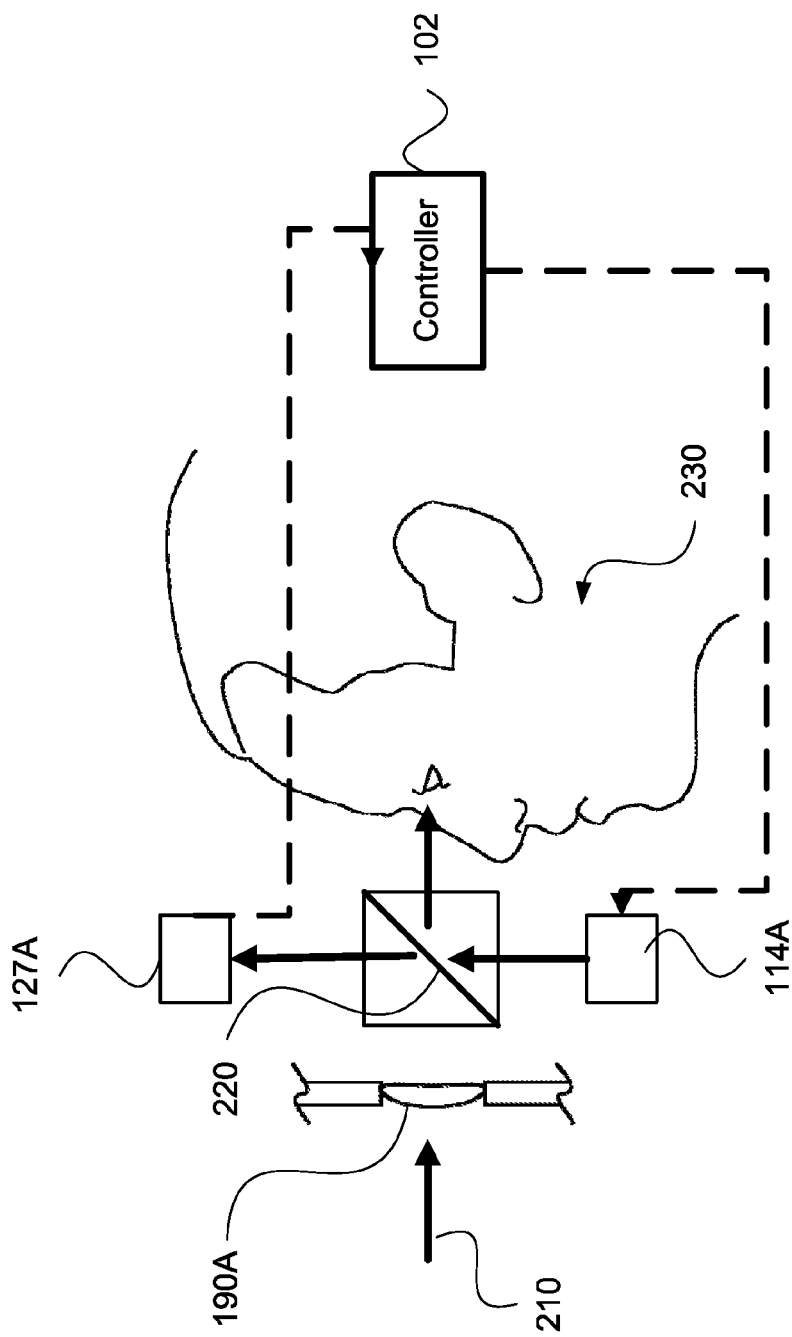
FIG. 2 shows the left side view of a goggle of the system of FIGS. 1A, 1B and 1C.

Each step or sub-process in the processes of the methods described below is associated with one or more segments of the application program 133, and is performed by repeated execution of a fetch-execute cycle in the processor 105 or similar programmatic operation of other independent processor blocks in the goggle 101. FIG. 2 shows a left side view of the goggle 101. Light 210 from the real-world scene enters corresponding opening 190A. A double-sided mirror 220 reflects the light 210 into corresponding camera 127A. The camera 127A captures images of the scene in conjunction with the controller 102. The controller 102 processes the images, adds virtual objects to the images, and sends the images to the display 114A. The display 114A displays the images. The displayed images are reflected towards a corresponding eye (i.e., the left eye) of an end user 230 using mirror 220. The user 230 then sees the augmented view of the scene. The right side of the goggle 101 comprising the display 127B and display 114B functions similarly to the left side. The methods described below are executed in parallel and synchronously by both the left and right side of the goggle 101, so that two offset images are displayed on the displays 127A and 127B. The displayed images are presented separately to the left and right eye of the user 230 in a stereoscopic manner.

Figure 3:
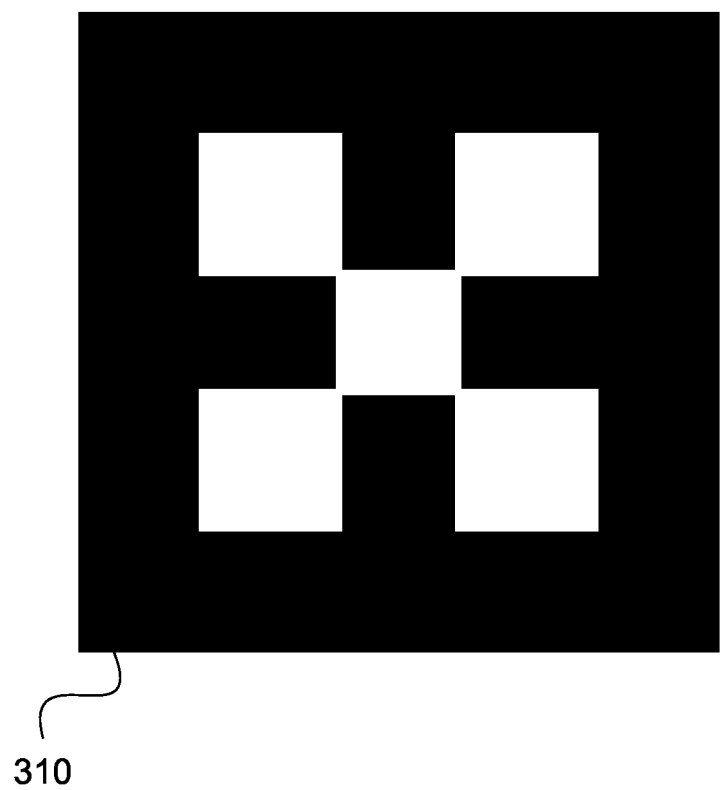
FIG. 3 shows a marker according to one arrangement.

FIG. 3 shows a marker 310 according to one of the disclosed arrangements. The marker 310 is a two-dimensional binary pattern distinguishable from other objects in the scene. The marker 310 is displayed in the real-world scene to inform the augmented reality system 100 of the location of a corresponding virtual object. A marker can also infer information about the virtual object. The marker 310 can also be used as a structured light pattern in 3D reconstruction. The marker 310 can also be used as an artifact in camera or projector calibrations. The marker 310 is projected onto the scene by an image projector projecting visible light. In FIG. 3, the projected image (i.e. a region where the projector emits light) is shown using the color black.

Figure 4:
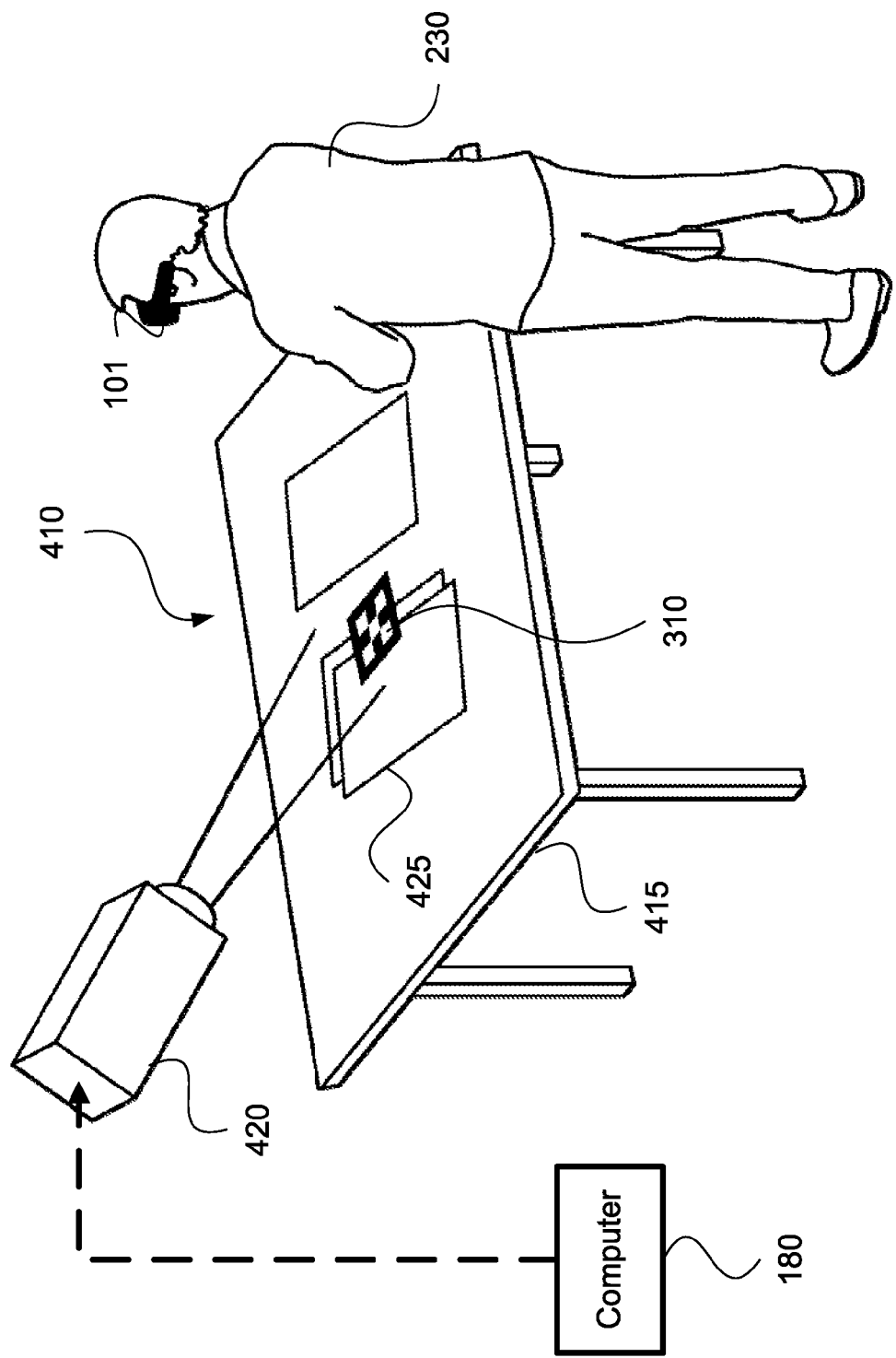
FIG. 4 shows the projection of the marker of FIGS. 3.

FIG. 4 shows the projection of the marker 310. The marker 310 is part of a scene 410 and is projected by an image projector 420. The scene comprises a desk 415 with papers 425 sitting on the desk 415. The digital image of the marker 310 is stored in the computer 180, and is projected using the projector 420. The projector 420 has a frame rate of 50 Hz. The computer 180 can turn the projection on/off within each frame.

Each of the cameras 127A and 127B captures a video stream of images (or frames) of the scene. In one arrangement, each image is a color image of 640×480 pixels. The frame rate is also 50 Hz, to match the frame rate of the projector 420, so that the projector 420 and the cameras 127A and 127B can be synchronized. Hence, the captured video streams from the cameras 127A and 127B do not have any flickering.

In one arrangement, detecting the marker in the images captured by the cameras 127A and 127B may be performed using Square markers are detected in the images captured by the cameras 127A and 127B.

Any suitable method may be used to detect the marker. In one arrangement, the marker to be detected is expected to be a square and to have a thick black border. Connected groups of black pixels are detected in the images captured by the cameras 127A and 127B. A pixel is considered to be black if the pixel has a grey value intensity below a predetermined threshold, while a white pixel has a grey value intensity above a different predetermined threshold. Straight lines are fitted to the connected groups. Groups surrounded by four straight lines are potential marker candidates. The four corners of the square marker and intersections of the four straight lines, are used to determine a homography matrix mapping from camera pixel coordinates to the plane of the marker. Candidates that do not map back to a square are rejected. The pixel content inside the marker is extracted. A marker is detected if the pixel content matches with expected binary pattern of the marker 310.

Conventional methods are designed for markers that are printed on white paper with black inks, where pixels have low grayscale values. In contrast, the marker disclosed here is projected using white light. The projected marker is represented by pixels with high grayscale values. The projected marker is particularly advantageous for an indoor scene, as the projected light is substantially brighter than ambient light. Camera image pixels corresponding to the projected marker may be segmented out by selecting pixels with grayscales above a predetermined threshold, such as a threshold=0.7 (where 0.0 means black and 1.0 means white).

A virtual object is a group of pixels, or an image, that are overlaid on top of camera image pixels by the controller 102, before being displayed on one of the displays 114A and 114B to the user 230. A virtual object is not tangible, and is only visible through an augmented view of a scene. The virtual object may be overlaid at a centre position of the detected marker in an image. The virtual object can be smaller than the marker, and in that case, portions of the marker are still visible from the augmented view of the scene. The color and shape of the virtual object can depend on the size and the orientation of the marker, the ambient lighting, or the time that the virtual object is rendered. For ease of explanation, the virtual object described below is a group of static pixels that do not change. The pixels are perceived as a cube in the augmented view of the scene by the user 230.

For a user 230 using the goggle 101 the projected marker 310 is hidden within the augmented view. The pixels captured by the cameras 127A and 127B that correspond to the projected marker 310 are replaced with pixel values representing the original scene.

The marker 310 is projected such that the marker 310 only appears once every two images (or frames). For the purposes of the present description, let W-frame denote an image (or frame) that has no marker projected. Let M-frame denote a frame that has a marker projected. As described below, the W-frame and M-frame are combined to output a video data stream where the projected marker 310 is hidden from the augmented view, while retaining the same video frame rate.

Figure 5:
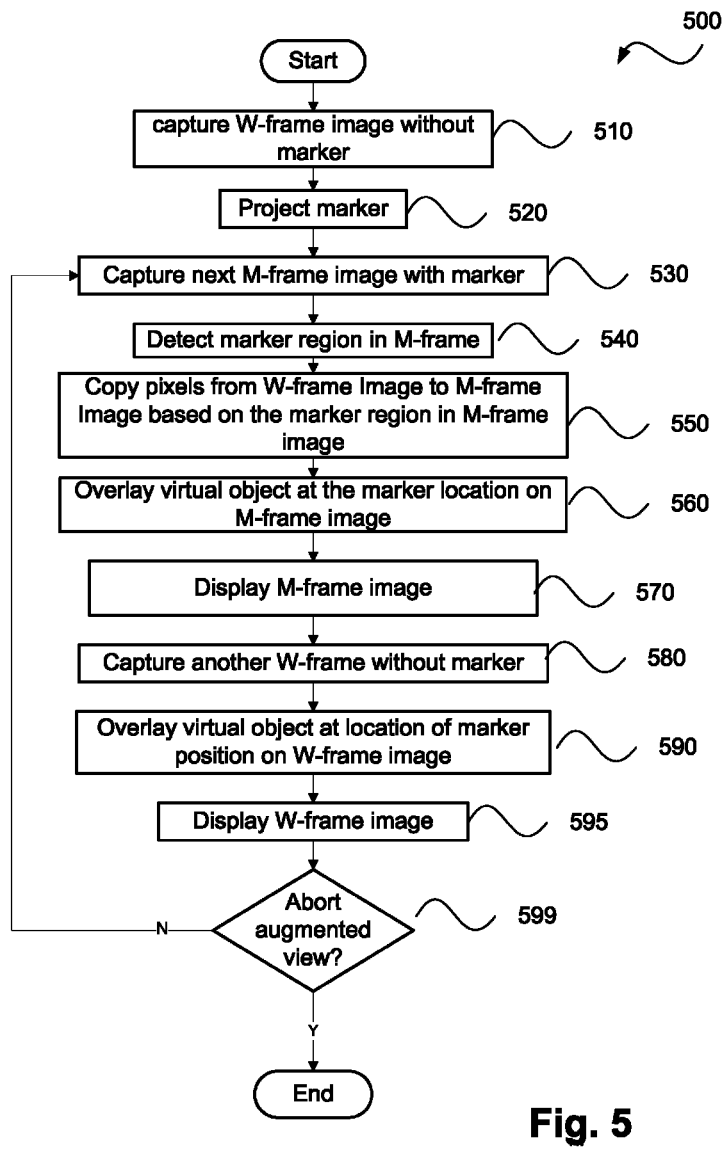
FIG. 5 is a flow diagram showing a method of removing a marker projected in a scene.

FIG. 5 is a flow diagram showing a method 500 of removing a marker projected in a scene from a view of the scene. The method 500 generates an augmented view of the scene with a marker removed. As described below the marker is effectively hidden in accordance with the method 500. The method 500 will be described by way of example with reference to example images (frames) shown in FIG. 6. The method 500 is described with reference to the left side of the goggle 101 including the display 114A and camera 127A. However, the method 500 is similarly executed in parallel and synchronously by the right side of goggle 101 at the same time.

Figure 6:
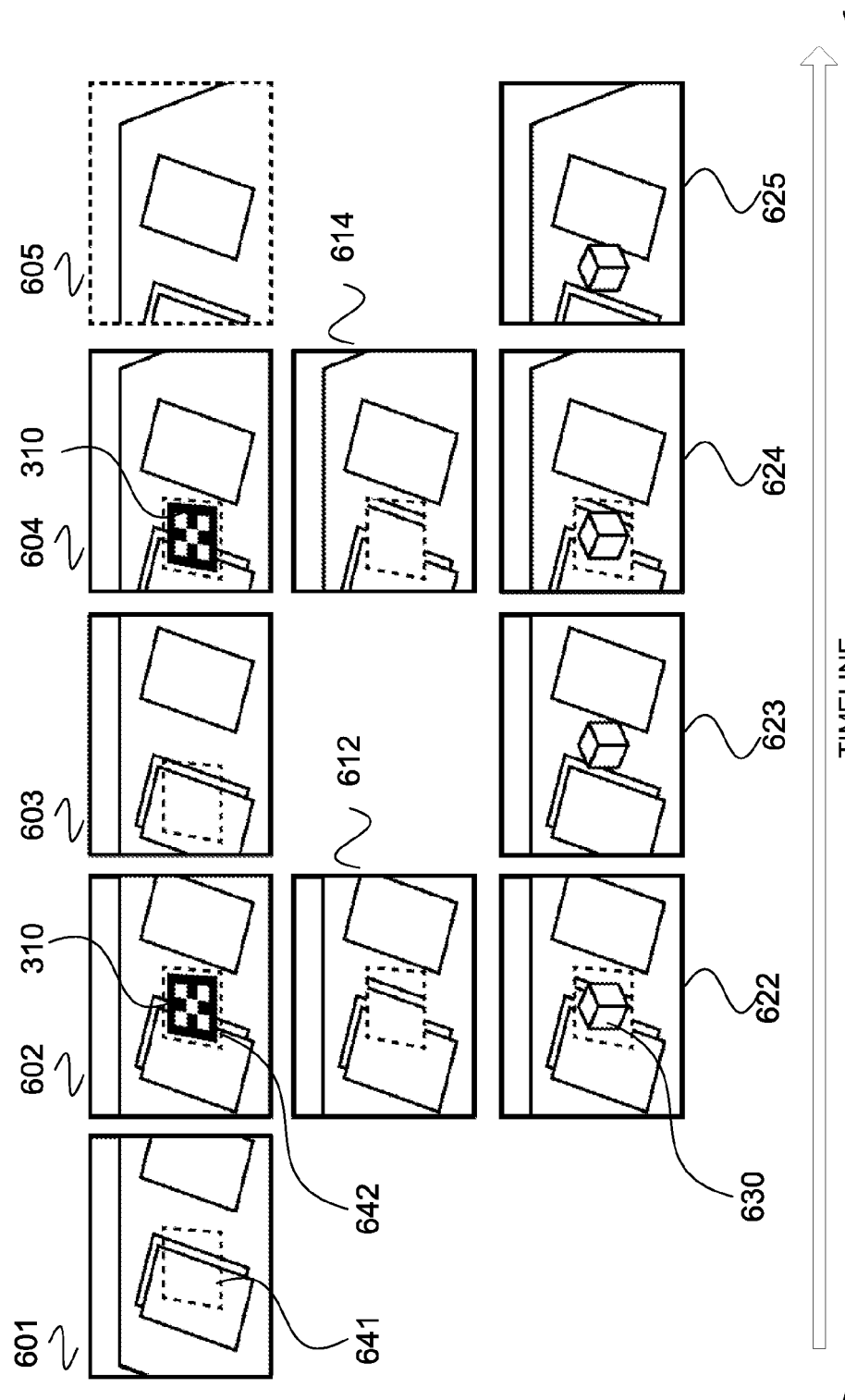
FIG. 6 shows some example images generated in accordance with the method of FIG. 5.

The method 500 is implemented as one or more software code modules of the software application program 133 resident within the ROM 160 and being controlled in its execution by the processor 105. The method 500 begins at first capturing step 510, where the camera 127A is used for capturing a W-frame which, as described above, is an image (or frame) of the scene 410 captured without the marker 310 being projected. In the example of FIG. 6, the W-frame captured at step 510 is an image 601 (or frame) of the scene 410 captured without the marker 310 being projected. The marker 310 was not projected for capturing the image 601. As seen in FIG. 6, the image 601 shows an indoor scene 410 comprising the desk 415 with the papers 425 on the desk 415. Dotted box 641 is not part of the scene 410.

Then in projecting step 520, the projector 420 projects the marker 310 onto an object in the scene 410, the marker 310 being projected onto objects including the desk 415 and papers 425 in the example of FIG. 6. The marker 310 may be projected by the projector 420 following the computer 180 receiving a projection request from the goggle 101 at step 520. The projection request may be transmitted by the processor 105 to the computer 180 via the connection 121 and communications network 120.

The method 500 continues at a second capturing step 530, where the camera 127A is used for capturing an M-frame which, as described above, is an image containing a representation of a projected marker. In the example of FIG. 6, the M-frame captured at step 530 is an image 602 (or frame) of the scene 410 as seen in FIG. 6, the image 602 containing a representation of the projected marker 310. The image 602 is captured following the marker 310 being projected onto the table 410 and papers 425 in the scene 410. As described below, the marker 310 is used to indicate a reference location in the scene 410 for positioning a virtual object.

Then in detecting step 540, the processor 105 is used for detecting marker region 642 in the image 602 (i.e., M-frame) that contains the representation of the marker 310 as seen in FIG. 6. The region 642 may be detected at step 540 the marker detection method described above. The marker region 642 is illustrated by a dotted box in the image 602.

The method 500 continues at copying step 550, where the processor 105 is used for copying pixels from the image (W-frame) 601 to image (M-Frame) 602 based on the marker region 642 in the image (M-frame) 602. The pixels in the region 641 in the image (W-frame) 601 are copied to the marker region 642 in the image 602 in FIG. 6 to generate resulting image 612.

The region 641 is selected at step 550 such that the region 641 has the same width and height as the region 642. The position of region 641 within the image (W-frame) 601 is the same as the position of region 642 within the image (M-frame) 602.

At overlaying step 560, the processor 105 is used for overlaying a virtual object 630 onto the copied image 612, at the location of the marker region 642, to generate overlaid image 622 as seen in FIG. 6. As seen in the image 622, the marker region 642 indicates the reference location in the scene 410 for positioning the virtual object 630.

Then in displaying step 570, the processor 105 is used for displaying the overlaid image 622 on the display 114A. The display 114A displays the image 622 so as to be seen by the left eye of the user 230 wearing the goggle 101, with the displayed image 622 forming an augmented view of the scene 410. As seen in FIG. 6, the marker 310 is hidden in the augmented view formed by the image 622 so as to effectively remove the marker 310 from the augmented view. As described above, the display 114B displays a similar image to the image 622 so as to be seen by the right eye of the user 230, with the image displayed by display 114B forming a similar augmented view of the scene 410.

The image 622 is generated at step 570 by using the pixels from the image 601 (W-frame) as pixel values at pixel locations where the projected marker 310 was located in the image 602 (M-frame) (i.e., within the marker region 642) to remove the projected marker 310 from the generated augmented view of the scene 410.

The method 500 continues at a third capturing step 580, where the camera 127A is used for capturing another W-frame which, in the example of FIG. 6, is an image 603 (or frame) of the scene 410 captured without the marker 310 being projected. The marker 310 may be stopped from being projected by the projector 420 at step 580 following the computer 180 receiving a no-projection request from the goggle 101 at step 580. The no-projection request may be transmitted by the processor 105 to the computer 180 via the connection 121 and communications network 120.

Then in overlaying step 590, the processor 105 is used for overlaying the virtual object 630 onto the newly captured image 603 (i.e., the newly captured W-frame), at the location of the marker region 642 detected in step 540, to generate the image 623 as seen in FIG. 6.

The method 500 concludes at displaying step 595, where the processor 105 is used for displaying the overlaid image 623 on the display 114A. The display 114A displays the image 623 to the user 230, and the displayed image 623 becomes the augmented view of the scene. As seen in FIG. 6, the marker 310 is hidden in the augmented view, as the marker 310 is not projected onto the scene in the image 623. The virtual object 630 is copied from the M-frame in the form of the image 602 that has the marker 310 into the W-frame in the form of the image 603 that has no marker. As seen in FIG. 6, the virtual object 630 is positioned relative to the projected marker 310 captured in the second image 602 and using pixels from the first image 601 as pixel values at pixel locations where the projected marker 310 was located in the image 602. As described above, the pixels from the image 601 used to generate the augmented view of the scene 401 are located using the marker 310.

At decision step 599, if the processor 105 detects that the user 230 wishes to abort the augmented view (for example, upon the user pressing an 'exit' button (not shown) associated and/or generated with the goggle 101), then the method 500 ends. Otherwise, the method 500 returns to step 530, where the camera 127A is used for capturing a next M-frame which in the example of FIG. 6, is an image 604 (or frame) of the scene 410 as seen in FIG. 6, the image 604 containing a representation of the projected marker 310. FIG. 6 shows the captured image (frame) 604 to be displayed as an image 624 in accordance with the steps of the method 500. FIG. 6 also shows an example of a next captured W-frame in the form of image 605 which is displayed as image 625 in accordance with step 595 of the method 500.

FIG. 6 shows the images generated in accordance with the method 500 of FIG. 5. The images 601, 602, 603, 604 and 605 show five consecutive images captured of the scene 410 by camera 127A over a period of time represented by a timeline in FIG. 6. As described above, the scene 410 is a desk 415 with papers 425 on the desk 415. In the example of FIG. 6, the camera 127A pans to the right, in response to the head of the user 230 turning, and the scene 410 and the marker 310 appears to move to the left. As seen in FIG. 6, the image 602 and the image 604 containing the representation of the marker 310 are interleaved with the images 601, 603 and 605 which do not contain the marker 310.

The intermediate images (frames) 612, 614 are images where the marker 310 is removed by covering the marker 310 using pixels from a previous image (i.e., images 601, 603) as pixel values at pixel locations where the projected marker 310 was located the images 612, 614 to remove the projected marker 310 from the generated view of the scene 410. The images 622, 623, 624 and 625 are images displayed to the user 230 on the display 114A. The images 622, 623, 624 and 625 are used by the processor 105 for forming a video data stream using at least the first captured image 601 and the second captured image 602 to generate the augmented view of the scene 410, with the data of the formed video data stream containing data representing the virtual object 630 as part of the captured images of the scene 410, the virtual object 630 being positioned in the images 622, 623, 624 and 625, relative to the projected marker 310 captured in the second image 602.

As described above, steps 540, 550, 560 and 570 of the method 500 are executed by the processor 105 of the goggle 101. Alternatively, one or more of the steps of the method 500 may be executed by the computer 180. In one arrangement, the method 500 may be executed by the computer 180 where a camera of the computer 180 is used to capture the images of the scene 410 at steps 510, 530 and 580.

The frame rate of the images 622 to 625 of the generated augmented view is the same (i.e., equal to) as the capture frame rate of the images 601 to 605. The augmented view formed using the images 622, 623, 624 and 625 in accordance with the method 500 is synchronized with the scene 410 so that there is no frame delay between a captured image (e.g., 603) and a corresponding image (e.g., 623) representing the displayed augmented view.

The virtual object 630 appears in the same image (frame) 602 that the marker 310 is first detected (i.e. the virtual object 630 appears in an image (frame) T, when the marker 310 is detected in image (frame) T). The pixels from a W-frame image generated in accordance with the method 500 may cause a visual artifact when the pixels are copied onto an M-frame image as at step 550. Such a visual artifact may be made less noticeable with image smoothing.

Figure 7:
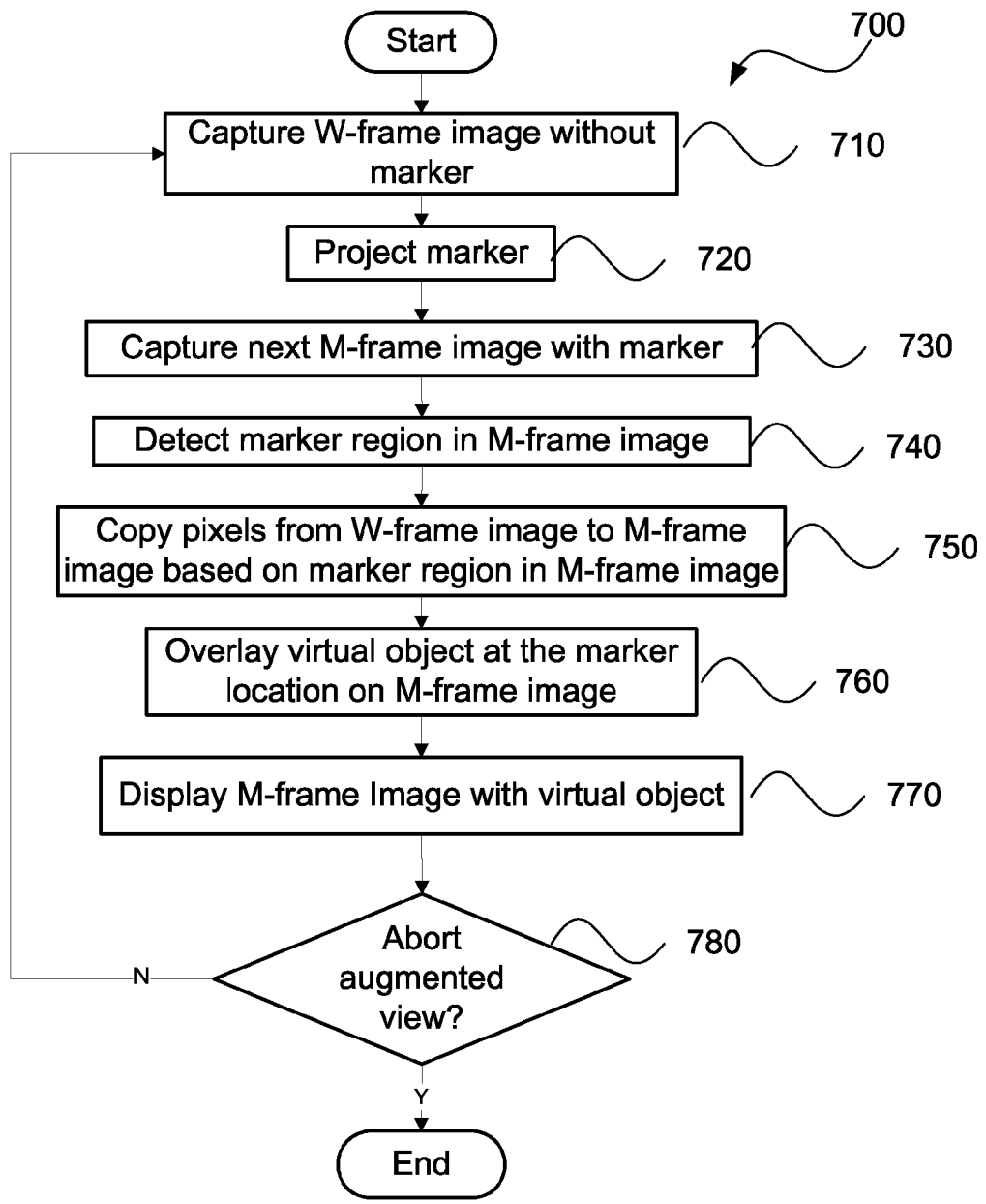
FIG. 7 is a flow diagram showing another method of removing a marker projected in a scene.

FIG. 7 is a flow diagram showing an alternative method 700 of removing a marker projected in a scene from a view of the scene. The method 700 is an alternative process for generating an augmented view of the scene with the marker removed. As described below, the marker is effectively hidden. The method 700 will be described by way of example with reference to example images (frames) shown in FIG. 8. The method 700 is described with reference to the left side of the goggle 101 including the display 114A and camera 127A. However, the method 700 is similarly executed in parallel and synchronously by the right side of goggle 101 at the same time.

The method 700 is implemented as one or more software code modules of the software application program 133 resident within the ROM 160 and being controlled in its execution by the processor 105.

Figure 8:
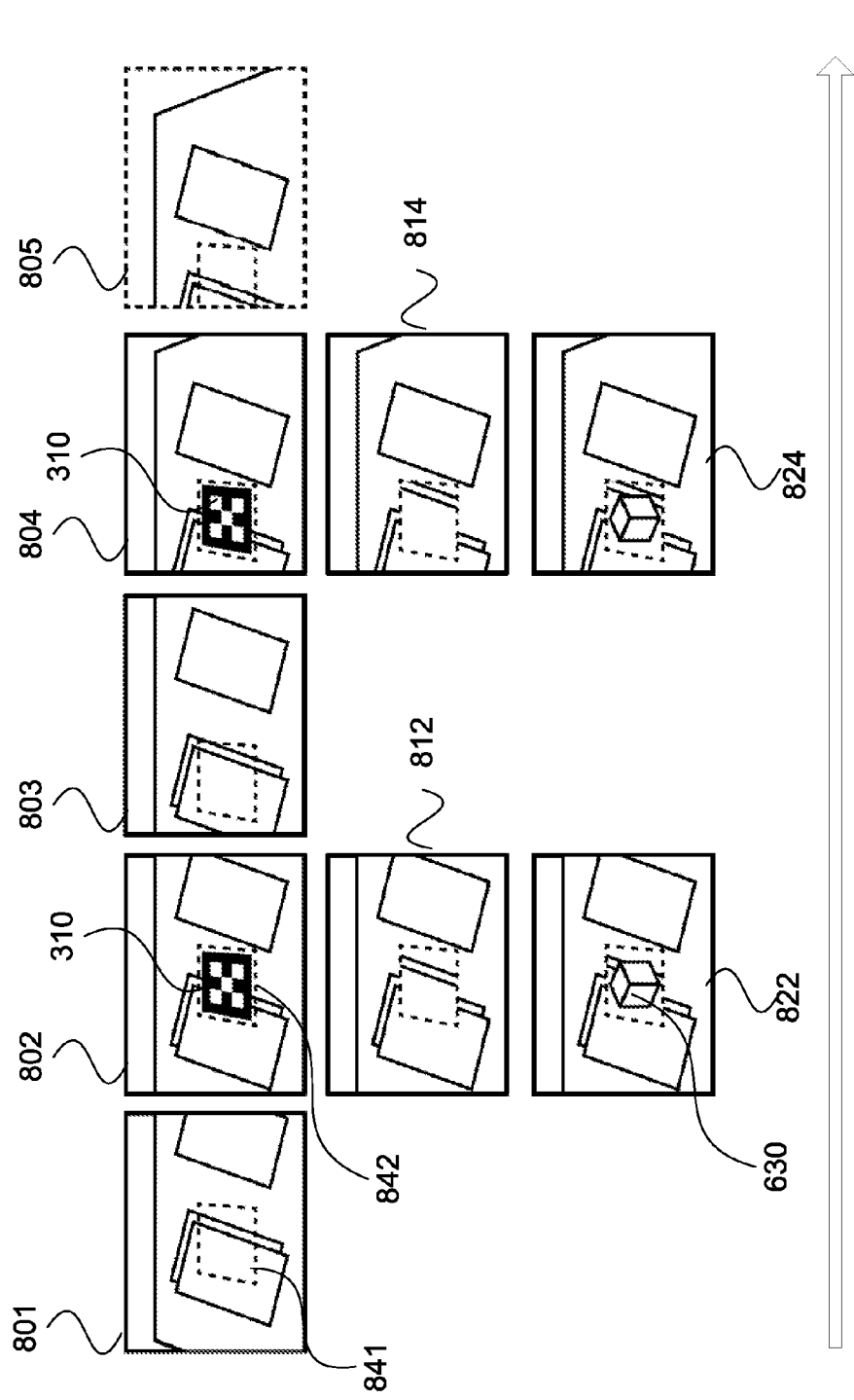
FIG. 8 shows some example images generated in accordance with the method of FIG. 7.

The method 700 begins at first capturing step 710, where the camera 127A is used for capturing a W-frame which, as described above, is an image (or frame) of the scene 710 captured without the marker 310 being projected. In the example of FIG. 8, the W-frame captured at step 710 is an image 801 (or frame) of the scene 410 captured without the marker 310 being projected. The marker 310 was not projected for capturing the image in the image 801. As seen in FIG. 8, the image 801 shows the indoor scene 410 comprising the desk 415 with the papers 425 on the desk 415. Again, the dotted box 841 is not part of the scene 410.

Then in projecting step 720, the projector 420 projects the marker 310 onto the scene an object in the scene 410, again, with the marker 310 being projected onto objects including the desk 415 and papers 425 in the example of FIG. 6. Again, the marker 310 may be projected by the projector 420 following the computer 180 receiving a projection request from the goggle 101 at step 720. The projection request may be transmitted by the processor 105 to the computer 180 via the connection 121 and communications network 120.

The method 700 continues at a second capturing step 730, where the camera 127A is used for capturing an M-frame. In the example of FIG. 8, the M-frame captured at step 730 is an image 802 (or frame) of the scene 410 as seen in FIG. 8, the image 802 containing a representation of the projected marker 310. The image 802 is captured following the marker 310 being projected onto the table 410 and papers 425 in the scene 410. Again, the marker 310 is used to indicate a reference location in the scene 410 for positioning a virtual object.

Then in detecting step 740, the processor 105 is used for detecting marker region 842 in the image 802 (i.e., M-frame)

that contains the representation of the marker 310 as seen in FIG. 6. The region 842 may be detected at step 740 using any of the methods described above. The region 842 is illustrated by a dotted box in the image 802.

The region 841 is selected such that the region 841 has the same width and height as the region 842. The location of region 841 within the image (W-frame) 801 is the same as the location of region 842 within the image (M-frame) 802.

The method 700 continues at copying step 750, where the processor 105 is used for copying pixels from the image (W-frame) 801 to image (M-Frame) 802 based on the marker region 842 in the image (M-frame) 802. The pixels in the region 841 in the image (W-frame) 801 are copied to the marker region 842 in the image (M-Frame) 802 in FIG. 8 to generate resulting image 812.

At overlaying step 760, the processor 105 is used for overlaying the virtual object 630 onto the copied image 812, at the location of the marker region 842 to generate overlaid image 822 as seen in FIG. 8. As seen in the image 842, the marker region 842 indicates the reference location in the scene 410 for positioning the virtual object 630.

Then in displaying step 770, the processor 105 is used for displaying the overlaid image 822 on the display 114A. The display 114A displays the image 822 as to be seen by the left eye of the user 230 wearing the goggle 101, with the displayed image 822 forming an augmented view of the scene 410. The display 114A displays the image 822 so as to be seen by the left eye of the user 230 wearing the goggle 101, with the displayed image 822 forming an augmented view of the scene 410. As seen in FIG. 8, the marker 310 is hidden in the augmented view formed by the image 822 so as to effectively remove the marker 310 from the augmented view. As described above, the display 114B displays a similar image to the image 822 so as to be seen by the right eye of the user 230, with the image displayed by display 114B forming a similar augmented view of the scene 410.

At decision step 780, if the processor 105 detects that the user 230 made wishes to abort the augmented view (for example, upon the user pressing an 'exit' button (not shown) associated and/or generated with the goggle 101), then the method 700 ends. Otherwise, the method 700 returns to step 710, where the camera 127A is used for capturing a next W-frame, which in the example of FIG. 8, is an image 803 of the scene 410 as seen in FIG. 8, where the image 803. FIG. 8 illustrates the captured images (frames) 804, 805 and the image (frame) 824 to be displayed as the augmented view of the scene 410.

FIG. 8 shows the images generated in accordance with the method 700 of FIG. 7. The images 801, 802, 803, 804 and 805 are five consecutive images captured of the scene 410 by camera 127A over a period of time represented by a timeline in FIG. 8. As described above, the scene 410 is a desk 415 with papers 425 on the desk. In the example of FIG. 8, the camera 127A pans to the right, in response to the head of the user 230 turning, and the scene 410 and the marker 310 appear to move to the left. As seen in FIG. 8, the image 802 and the image 604 containing the representation of the marker 310 are interleaved with the images 801, 803 and 805 which do not contain the marker 310.

The intermediate images (frames) 812, 814 are images where the marker 310 is removed by covering the marker 310 using pixels from a previous image (i.e., 801, 803) as pixel values at pixel locations where the projected marker 310 was located the images 812, 814 to remove the projected marker 310 from the generated view of the scene 410. The images 622, 623, 624 and 625 are images displayed to the user 230 on the display 114A. The images 822 and 824 are used by the processor 105 for forming a video data stream using at least the first captured image 801 and the second captured image 802 to generate the augmented view of the scene 410. As described above, the data of the formed video data stream contains data representing the virtual object 630 as part of the captured images of the scene 410, with the virtual object 630 being positioned in the images 822 and 624 and 625, relative to the projected marker 310 captured in the second image 802.

As described above, steps 740, 750, 760 and 770 of the method 700 are executed by the processor 105 of the goggle 101. Alternatively, one or more of the steps of the method 700 may be executed by the computer 180. In one arrangement, the method 700 may be executed by the computer 180 where a camera of the computer 180 is used to capture the images of the scene 410 at steps 810 and 830.

The augmented view formed using the images 822 and 824 in accordance with the method 700 is synchronized with the scene 410 so that there is no frame delay between a captured image (e.g., 802) and a corresponding image (e.g., 822) representing the displayed augmented view. The virtual object 630 appears in the same image (frame) 802 that the marker is first detected (i.e. the virtual object 630 appears in an image (frame) T, when the marker 310 is detected in image (frame) T).

The alternative method 700 described in FIG. 7 requires less processing, than the method 500. However, the frame rate of the augmented view formed using the method 700 is halved. The pixels from a W-frame image generated in accordance with the method 700 may cause a visual artifact when the pixels are copied onto an M-frame image as at step 850. Such a visual artifact may be made less noticeable with image smoothing.

Figure 9:
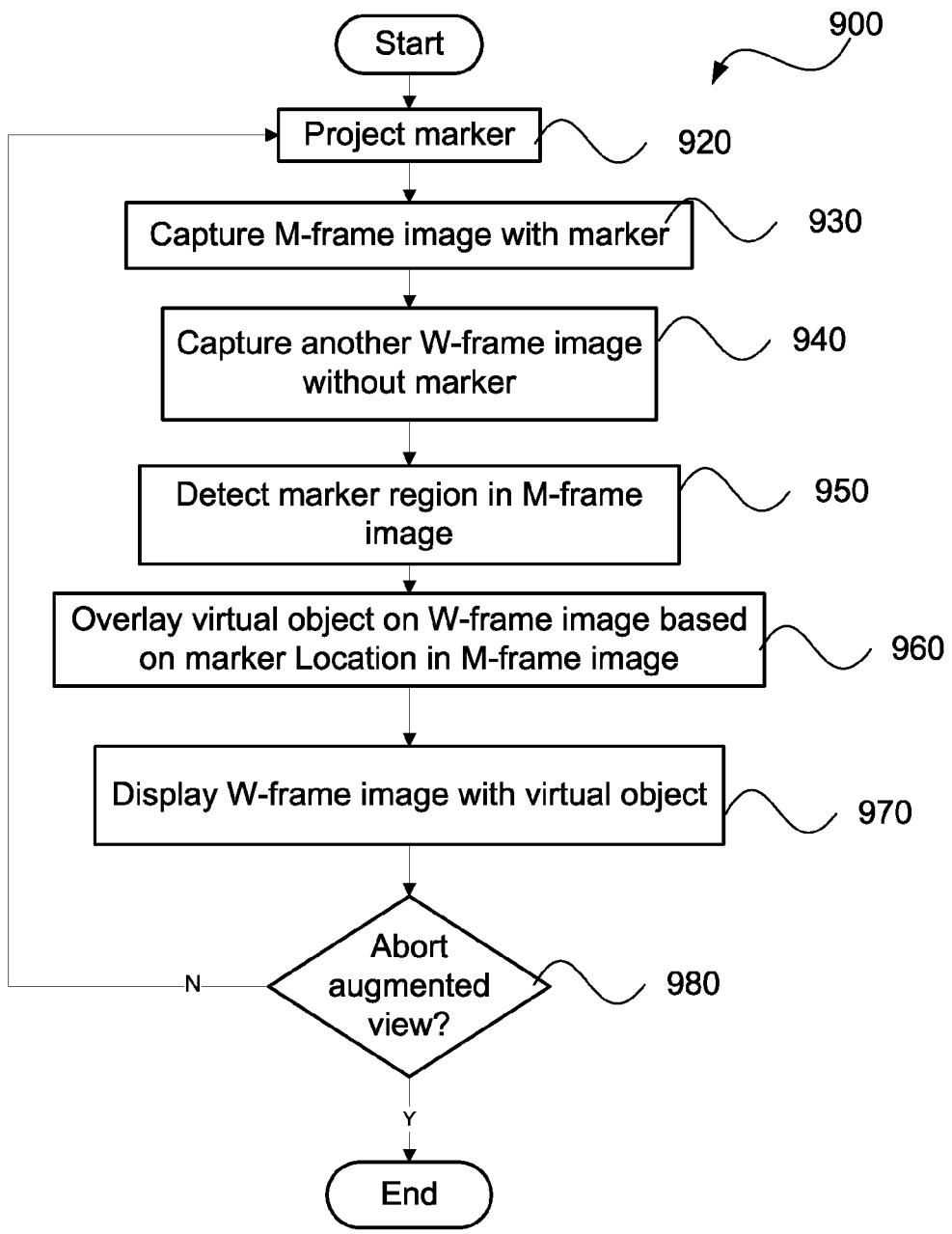
FIG. 9 is a flow diagram showing another method of removing a marker projected in a scene.

FIG. 9 is a flow diagram showing a method 900 of removing a marker projected in a scene from a view of the scene. The method 900 generates an augmented view of the scene without a marker. As described below the marker is effectively hidden in accordance with the method 900. The method 900 will be described by way of example with reference to the example images (frames) shown in FIG. 10. The method 900 is described with reference to the left side of the goggle 101 including the display 114A and camera 127A. However, the method 900 is similarly executed in parallel and synchronously by the right side of goggle 101 at the same time.

The method 900 is implemented as one or more software code modules of the software application program 133 resident within the ROM 160 and being controlled in its execution by the processor 105.

Figure 10:
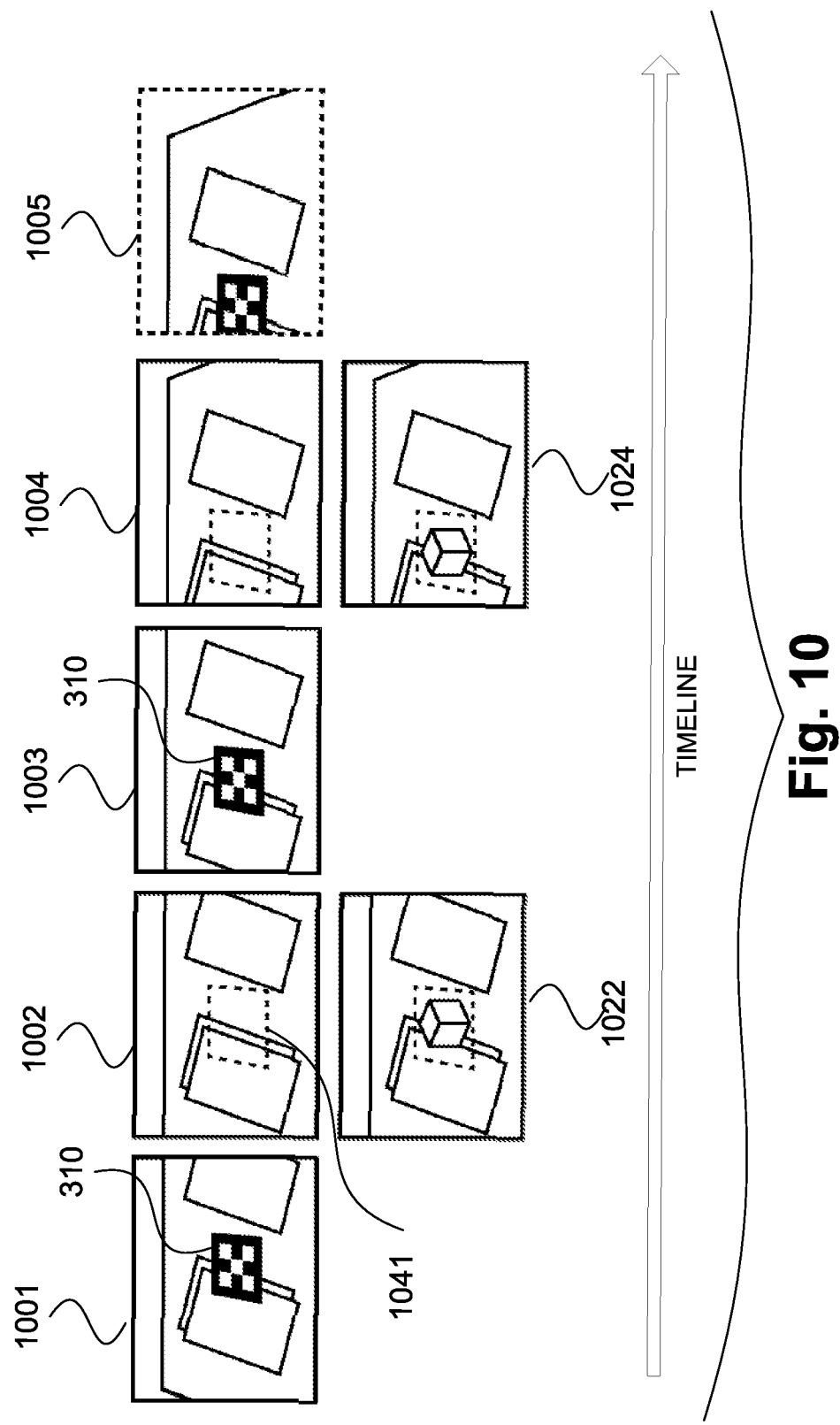
FIG. 10 shows some example images generated in accordance with the method in FIG. 9.

The method 900 begins at projecting step 920, where the projector 420 projects a marker 310 onto an object in the scene 410, the marker 310 being projected onto objects including the desk 415 and papers 425 in the example of FIG. 10. The marker 310 may be projected by the projector 420 following the computer 180 receiving a projection request from the goggle 101 at step 920. The projection request may be transmitted by the processor 105 to the computer 180 via the connection 121 and communications network 120.

At a first capturing step 930, the camera 127A is used for capturing an M-frame which, as described above, is an image containing a representation of a projected marker. In the example of FIG. 10, the M-frame captured at step 930 is an image 1001 (or frame) of the scene 410 containing a representation of the projected marker 310. The image 1001 is captured following the marker 310 being projected onto the table 410 and papers 425 in the scene 410. As described below, the marker 310 is used to indicate a reference location in the scene 410 for positioning a virtual object. As seen in FIG. 10, the image 1001 shows the indoor scene 410 comprising the desk 415 with the papers 425 on the desk 415.

Then in a second capturing step 940, the camera 127A is used for capturing a W-frame which, in the example of FIG. 10, is an image 1002 (or frame) of the scene 410 captured without the marker 310 being projected. The marker 310 may be stopped from being projected by the projector 420 at step 940 following the computer 180 receiving a no-projection request from the goggle 101 at step 940. The no-projection request may be transmitted by the processor 105 to the computer 180 via the connection 121 and communications network 120.

At detecting step 950, the processor 105 is used for detecting marker region 1041 in the image 1002 (i.e., M-frame) that contains the representation of the marker 310 as seen in FIG. 10. The region 1041 may be detected at step 950 using any of the methods described above. The region 1041 is illustrated by a dotted box in the image 1002.

Then at overlaying step 960, the processor 105 is used for overlaying the virtual object 630 onto the image 1002, at the location of the marker region 1041 to generate overlaid image 1022 as seen in FIG. 10. The image 1022 forms an augmented view of the scene 410.

The method 900 concludes at displaying step 970, where the processor 105 is used for displaying the overlaid image 1022 (i.e., the augmented view of the scene 410) on the display 114A to the user 230.

At decision step 980, if the processor 105 detects that the user 230 wishes to abort the augmented view (for example, upon the user pressing an 'exit' button (not shown) associated and/or generated with the goggle 101), then the method 900 ends. Otherwise, the method 900 returns to step 920, where the projector 420 projects the marker 310 onto an object in the scene 410. The camera 127A is then used for capturing a next M-frame, which in the example of FIG. 10, is an image 1003 of the scene 410 as seen in FIG. 10, the image 1003 containing a representation of the projected marker 310. FIG. 10 shows the captured image (frame) 1003. FIG. 10 also shows an example of a next captured W-frame in the form of image 1004 which is displayed as image 1024 with the virtual object 630 overlayed onto the image 1004. The image 1024 forms the augmented view of the scene 410.

FIG. 10 shows the images generated in accordance with the method 900 of FIG. 9. The images 1001, 1002, 1003, 1004 and 1005 show five consecutive images of the scene 410 captured by camera 127A over a period of time represented by a timeline in FIG. 10. As described above, the scene 410 is the desk 415 with papers 425 on the desk 415. In the example of FIG. 10, the camera 127A pans to the right, in response to the head of the user 230 turning, and the scene 410 and the marker 310 appear to move to the left. As seen in FIG. 10, the image 1002 and the image 1004 which do not contain the marker 310 are interleaved with the images 1001, 1003 and 1005 containing the representation of the marker 310.

The images 1022 and 1024 are images displayed to the user 230 on the display 114. The images 1022 and 1024 are used by the processor 105 for forming a video data stream using at least the first captured image 1001 and the second captured image 1002 to generate the augmented view of the scene 410, with the data of the formed video data stream containing data representing the virtual object 630 as part of the captured images of the scene 410, the virtual object 630 being positioned in the images 1022 and 1024, relative to the projected marker 310 captured in the image 1001.

As described above, steps 950 and 960 of the method 900 are executed by the processor 105 of the goggle 101. Alternatively, one or more of the steps of the method 900 may be executed by the computer 180. In one arrangement, the method 900 may be executed by the computer 180 where a camera of the computer 180 is used to capture the images of the scene 410 at steps 930 and 940.

The augmented view using the images 1022 and 1024 in accordance with the method 1000 is synchronized with the scene 410 so that there is no frame delay between a captured image (e.g., 1002) and a corresponding image (e.g., 1022) representing the displayed augmented view. The virtual object 630 appears one image (frame) after an image in which the marker 310 is first detected (i.e. there is one image (frame) delay).

There is no pixel copying in the method 900. The visual artifact which may occur in the method 500 of FIG. 5 is no longer a concern. Further, the method 900 described in FIG. 9 requires less processing, than the method 500. However, the frame rate of the augmented view is halved in the method 900.

The cameras 127A or 127B capture the video stream of images (or frames) of the scene. When the cameras 127A and 127B are panning while capturing the images, the scene captured in one image (or frame) appears to shift relative to a previous or subsequent images (frames). In other words, pixels capturing an object in the scene located at coordinates $(x_0, y_0)$ of one image (frame) appear at a new coordinate $(x_1, y_1)$ of the next image (frame). A motion vector $(x_1-x_0, y_1-y_0)$ represents the motion of the pixels representing the object. The processor 105 may be configured for determining a motion vector for detecting motion of the camera (e.g., 127A). As described below, the motion vector may be used for adjusting positions of pixels. The motion vector may also be used for copying the virtual object a new position, where the virtual object is copied to the new position based on the motion vector.

If the goggle 101 moves rapidly during video capture, additional steps may be used to reduce two undesirable effects caused by the rapid movement. The effects include pixel mismatch and displacement of the virtual object.

Pixel mismatch occurs when pixels from one image (frame) are copied into another image (frame). The pixels that are copied from the first image (frame) do not match the adjacent pixels in the second image (frame) since either the object or camera (e.g., 127A) has moved between images (frames). Such a situation may occur in step 550 of the method 500 of FIG. 5, where the processor 150 copies pixels from the W-frame to the M-frame based on the detected marker region in the M-frame. Objects in the marker region may have moved between the W-frame and the M-frame such that the copied pixels do not match surrounding pixels as depicted in image 622 of FIG. 6. Pixel mismatch may also occur in step 750 of the method 700, which is depicted in image 822 of FIG. 8.

The pixel mismatch may be addressed by applying a motion vector to determine which pixels to copy from the W-frame. In this instance, the processor 150 determines the region in the W-frame to copy, then modifies the location by a motion vector. For example, if a marker pixel is located at coordinate (100,100) in an M-frame image. A motion vector of (30, 5) is determined for a corresponding region of the M-frame image. The processor 150 then copies a pixel value from coordinate (70, 95) in the W-frame, rather than the pixel at coordinate (100,100).

Motion of the camera (e.g., 127A) or objects on the scene may also cause the virtual object (e.g., 630) to be displaced from where the virtual object should be located in an image (frame). Displacement of the virtual object occurs in a W-frame image where the position of the marker in an adjacent image is used. However, since the objects in the scene have moved, the marker location in the adjacent image will not be correct for a current image. As a result, the virtual object will be in the wrong position with respect to the objects in the scene. Such a situation may occur in step 590 of the method 500 where the processor 150 overlays the virtual object onto the newly captured W-frame. The processor 150 overlays the virtual object at the position of the marker region in the M-frame detected in step 540. The position of the marker region will move because the objects in the scene have moved. As a result the virtual object 630 is overlaid onto the position, as seen in image 623. A similar problem may occur at step 960 of method 900. The position of the virtual object 630 may be more accurately determined by determining a motion vector between the W-frame and the M-frame and applying the motion vector to the position of the virtual object 630. For example, a marker pixel may be located at coordinate (100,100) in an M-frame with the processor 105 determining a motion vector of (30, 5) between the M-frame and the W-frame. The processor 150 may then place the virtual object at coordinate (130, 105) in the W-frame by adding the motion vector to the location of the marker from the M-frame.

Figure 11:
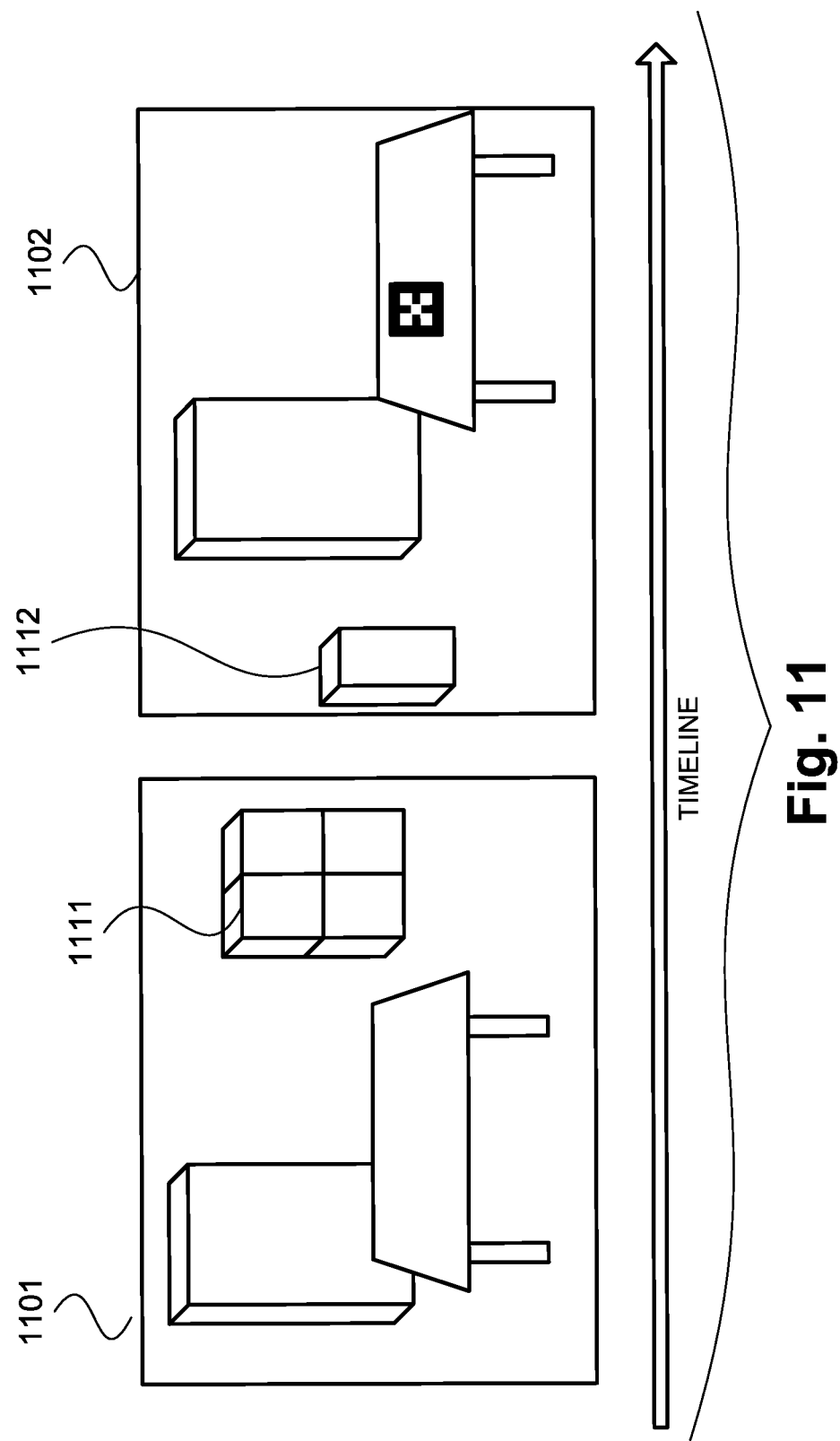
FIG. 11 shows an example of two captured image while the camera used to capture the images is panning from right towards the left.

FIG. 11 shows an example of two captured images (frames) 1101 and 1102 while a camera (e.g., 127A) is panning from right to left. A first image (frame) 1101 and a second image (frame) 1102 are captured while the camera 127A pans across the scene. Image pixels representing objects in the scene move to the right in the second image (frame) 1102 while objects in the scene 1111, such as object 1111 may move out of view of the camera 127A. Conversely, new objects may enter the view of the camera 127A, such as object 112.

Figure 12:
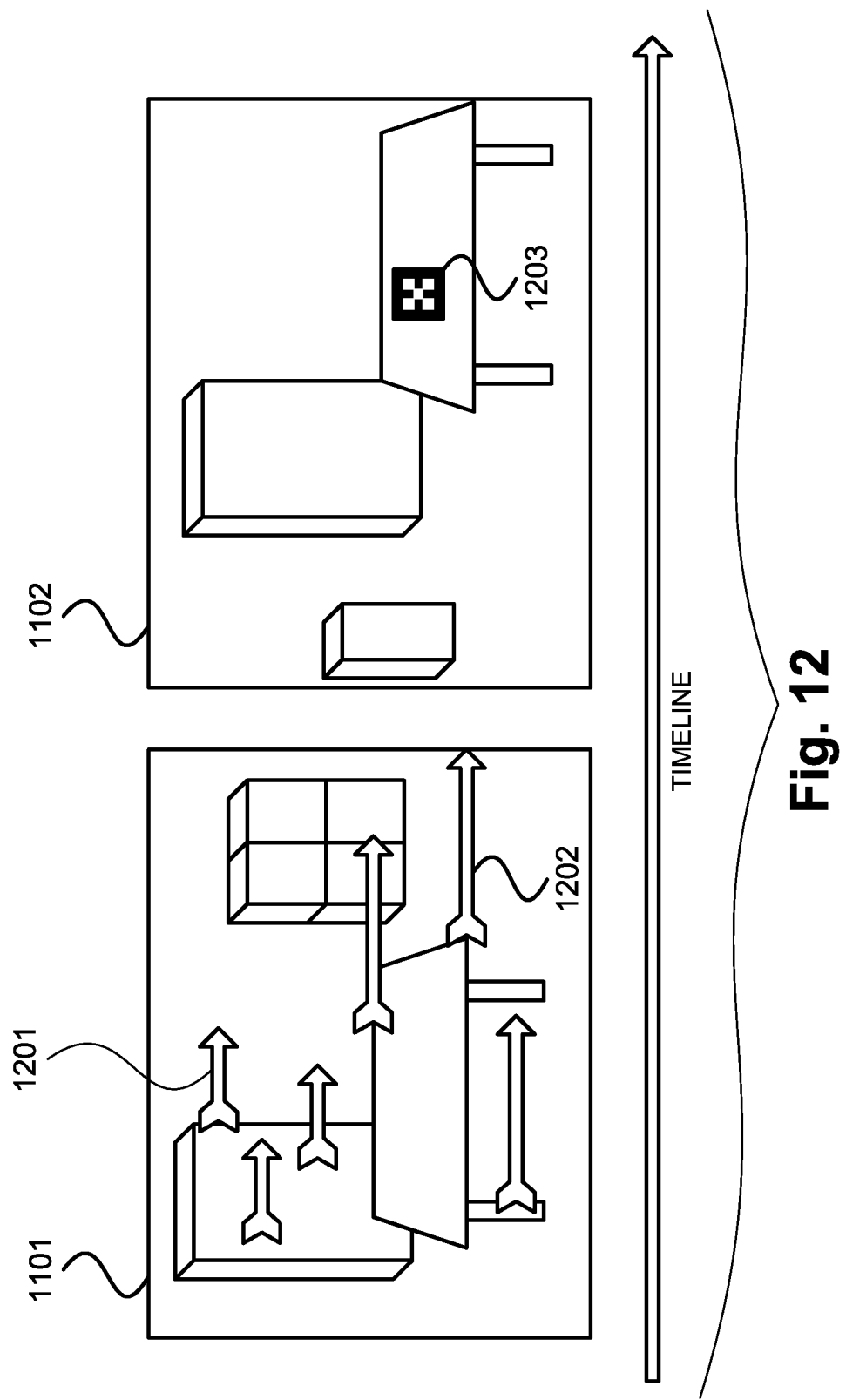
FIG. 12 shows the images of FIG. 11 with representative motion vectors.

FIG. 12 shows the images 1101 and 1102 of FIG. 11 with motion vectors, such as motion vectors 1201 and 1202. A tail of the motion vectors represent a pixel in the first image 1101. The head of the arrow 1201, 1202 represent the new coordinate in the second image 1102 that corresponds to the same pixel in 1101. Objects located further from the camera 127A have a smaller motion vector, such as the motion vector 1201, while objects closer to the camera 127A have larger motion vectors, such as motion vector 1202.

A motion vector may be established when a pixel in the first image 1101 and a corresponding pixel in the second image 1102 are found. Objects that enter or exit the image 1101 do not have motion vectors because corresponding pixels are unable to be located in the second image 1102. As a result, pixels of a projected marker 1203 in image 1102 do not have a motion vector because the marker is not in the image 1101. However, a motion vector for projected marker pixels may be generated to compensate for movement of the projected marker location caused by camera motion.

A motion vector of a marker pixel may be estimated by taking an average of the motion vectors of nearby pixels. In one arrangement the augmented reality system described above, nearby pixels are pixels that are with thirty (30) pixels of the marker pixel.

In one arrangement, the augmented reality system 100 uses the OpenCV-calcOpticalFlowSF method to calculate a motion vector of a pixel. The OpenCV-calcOpticalFlowSF method may be used to estimate a motion vector for a pixel coordinate (x, y) in the W-frame. The OpenCV-calcOpticalFlowSF method defines, in the M-frame, a window of possible motion vectors of the pixel. In the augmented reality system 100, the window is defined with a top-left corner at coordinate (x−20, y−20), and a bottom-right corner at coordinate (x+20, y+20) for a 40×40 pixel window. The OpenCV-calcOpticalFlowSF method then calculates pixel intensity differences between the pixel (x, y) of the W-frame and all pixels in the window in the M-frame, to generate a window of pixel differences. Next, a bilateral filter is applied to the window of pixel differences to remove noise.

The bilateral filter creates a smoothed pixel difference window. The filter uses two weights. The first weight of the filter is the Gaussian of the color difference. The second weight of the filter is the Gaussian of the pixel position, in the window, away from (x, y). The result of the bilateral filter is the smoothed pixel difference window. A pixel with the smallest difference is then located in the smoothed pixel window. The coordinate of the pixel with the smallest difference (i.e. the minimal value in the result of this bilateral filter) is the motion vector of the pixel (x, y) in the M-frame. A reliability of the detected motion vector may be measured as a difference between the average value in the smoothed pixel difference window and the minimal value in the smoothed pixel difference window.

The motion vector estimation method described above is then repeated for each nearby pixel of the marker pixel in the M-frame to form a collection of motion vectors. Each of the motion vectors in the collection will have a corresponding reliability. The collection of motion vectors may then be filtered to determine an overall motion vector for the marker. The filter may use the reliability measures as weighting values to determine the overall motion vector. The overall motion vector of the marker pixels may then be used to compensate for the position of the pixels to be copied between frames, and to compensate the position of the overlaid virtual object.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of removing a projected marker projected in a scene from a view of the scene, the method comprising:
capturing a first image of the scene using a camera with the projected marker disabled;
capturing a second image of the scene, using the camera, with the projected marker enabled, the projected marker being projected onto an object in the scene using an image projector projecting visible light to indicate a reference location in the scene for positioning a virtual object, the second image containing a representation of the projected marker, wherein the second image is interleaved with the first image and the projection of the projected marker by the image projector is synchronised with the capturing of the second image; and forming a data stream using at least the first and second image to generate a view of the scene, the data stream containing data representing the virtual object as part of the captured images of the scene, the virtual object being positioned relative to the projected marker captured in the second image and using pixels from the first image as pixel values at pixel locations where the projected marker was located in the second image to remove the projected marker from the generated view of the scene.

2. The method according to claim 1, wherein the pixels from the first image used to generate the view of the scene are located using the projected marker.

3. The method according to claim 1, further comprising detecting the projected marker in the second image.

4. The method according to claim 1, further comprising overlaying the virtual object onto the second image at a location of the projected marker.

5. The method according to claim 1, further comprising displaying the second image to generate the view of the scene.

6. The method according to claim 1, further comprising copying pixels from the first image to second image based on the projected marker.

7. The method according to claim 1, wherein a frame rate of the generated view is equal to a capture rate of the first image and the second image.

8. The method according to claim 1, wherein the virtual object appears in the second image when the projected marker is detected in the second image.

9. The method according to claim 1, wherein the virtual object appears in an image of the generated view after an image in which the projected marker is first detected.

10. The method according to claim 1, further comprising determining a motion vector for detecting camera motion.

11. The method according to claim 1, further comprising:
determining a motion vector for detecting camera motion; and
adjusting positions of pixels using the motion vector.

12. The method according to claim 1, further comprising:
determining a motion vector for detecting camera motion; and
copying the virtual object to a new position based on the motion vector.

13. An apparatus for removing a projected marker projected in a scene from a view of the scene, the apparatus comprising:
capturing means for capturing a first image of the scene using a camera with the projected marker disabled, and for capturing a second image of the scene, using the camera, with the projected marker enabled, the projected marker being projected onto an object in the scene using an image projector projecting visible light to indicate a reference location in the scene for positioning a virtual object, the second image containing a representation of the projected marker, wherein the second image is interleaved with the first image and the projection of the projected marker by the image projector is synchronised with the capturing of the second image; and
forming means for forming a data stream using at least the first and second image to generate a view of the scene, the data stream containing data representing the virtual object as part of the captured images of the scene, the virtual object being positioned relative to the projected marker captured in the second image and using pixels from the first image as pixel values at pixel locations where the projected marker was located in the second image to remove the projected marker from the generated view of the scene.

14. A system for removing a projected marker projected in a scene from a view of the scene, the system comprising:
a memory for storing data and a computer program;
a processor coupled to the memory for executing the computer program, said computer program comprising instructions for:
capturing a first image of the scene using a camera with the projected marker disabled;
capturing a second image of the scene, using the camera, with the projected marker enabled, the projected marker being projected onto an object in the scene using an image projector projecting visible light to indicate a reference location in the scene for positioning a virtual object, the second image containing a representation of the projected marker, wherein the second image is interleaved with the first image and the projection of the projected marker by the image projector is synchronised with the capturing of the second image; and
forming a data stream using at least the first and second image to generate a view of the scene, the data stream containing data representing the virtual object as part of the captured images of the scene, the virtual object being positioned relative to the projected marker captured in the second image and using pixels from the first image as pixel values at pixel locations where the projected marker was located in the second image to remove the projected marker from the generated view of the scene.

15. A non-transitory computer readable medium having a computer program stored thereon for removing a projected marker projected in a scene from a view of the scene, the program comprising:
code for capturing a first image of the scene using a camera with the projected marker disabled;
code for capturing a second image of the scene, using the camera, with the projected marker enabled, the projected marker being projected onto an object in the scene using an image projector projecting visible light to indicate a reference location in the scene for positioning a virtual object, the second image containing a representation of the projected marker, wherein the second image is interleaved with the first image and the projection of the projected marker by the image projector is synchronised with the capturing of the second image; and
code for forming a data stream using at least the first and second image to generate a view of the scene, the data stream containing data representing the virtual object as part of the captured images of the scene, the virtual object being positioned relative to the projected marker captured in the second image and using pixels from the first image as pixel values at pixel locations where the projected marker was located in the second image to remove the projected marker from the generated view of the scene.

* * * * *